Patented Jan. 29, 1952

2,584,085

UNITED STATES PATENT OFFICE 2,584,085

LUBRICANT

Fred H. Stross, Berkeley, Calif., assignor to Shell Development Company, San Francisco, Calif., a corporation of Delaware No Drawing. Application July 20, 1948,
Serial No. 39,805

14 Claims. (Cl. 252—28)

This invention relates to thixotropic gels and greases and to a process for their preparation. More particularly, it is concerned with silica gels stabilized against the action of water and having improved fire resistance and heat stability.

Oils which have been thickened by the addition of soaps for the formation of grease have the principal shortcoming of losing their grease-like properties at elevated temperatures. Similarly, such greases become too stiff for suitable operation at low temperatures. Greases containing appreciable amounts of fatty acid soaps are also subject to flammability, and, consequently, are a fire hazard wherever they are used.

Gels and greases have been produced by the dispersion of inorganic aerogels of such materials as silica, magnesia, alumina, etc. In the absence of water, the greases so produced have excellent thixotropic properties and are capable of retaining their gel structure at elevated temperatures; however, if they are attacked by moisture, the silica becomes hydrated and the gel-like properties of the composition are destroyed. These gels, since they contain non-flammable inorganic material, have an improved resistance to fire.

It is an object of the present invention to produce gels and greases having high temperature stability, water insensitivity and fire resistance. It is another object of this invention to produce gels and greases suitable for use as steel rolling-mill lubricants and for other purposes, such as oil-well drilling fluids. Other objects will become apparent during the following discussion.

Now, in accordance with this invention, it has been found that gels and greases which are water resistant, have structural stability at high temperature and are substantially non-flammable, comprise an oleaginous material thickened with an inorganic aerogel, the latter having absorbed thereon or therein an organosilicon halide.

Still, in accordance with this invention, it has been found necessary, when carrying out the absorption of the halide, on aerogel particles, to agitate the latter vigorously in order to promote uniform absorption on the surfaces. Each of the components of the subject compositions and the process of gel manufacture are discussed herewith.

Oleaginous medium

The oleaginous materials which may be used in preparing the compositions of the present invention principally constitute two principal classes, although oily materials in general are suitable. The first of these, for use in the preparation of greases, are those having a viscosity similar to that of petroleum lubricating oil. Suitable materials include mineral lubricating oils, corn oil, cottonseed oil and castor oil, as well as other vegetable and animal oils. The mineral oils especially suitable for the present compositions are those ranging in viscosity from thin instrument oils to heavy cylinder oils, and generally have SAE numbers from less than 10 to about 70. A second main class comprises oily substances having a thinner consistency. These may be employed for the preparation of more fluid thixotropic gels especially useful as oil-well drilling fluids and similar applications. Kerosene and light instrument oils are suitable species of this variety.

A special group of oleaginous materials which may be used in the products of the present invention include the group commonly referred to as "synthetic lubricants." These have a wide variety of characteristics and viscosities. They include such types as polymerized olefins, polyalkylene oxides, polyalkylene glycols, organic phosphates, phosphonates and phosphinates, and various high molecular weight esters, especially the dicarboxylic esters. Suitable species include polypropylene oxide, copolymers of trimethylene glycol and ethylene glycol, as well as esters such as di(2-ethylhexyl)sebacate and the corresponding adipate. Polymeric oxides and glycols preferably have molecular weights of 200–1500, while the esters referred to above are preferably prepared from acids having 4–10 carbon atoms and alcohols having 4–12 carbon atoms. Branched-chain alcohols give esters having the lowest pour points. The viscosity characteristics will determine, in a large degree, the character of gel or grease which may be prepared therefrom. For example, the thinner materials, such as low molecular weight polymers or the sebacate referred to above, form thixotropic gels of a more or less fluid character which are suitable for use as oil-well drilling fluids.

Preferably, these synthetic lubricants are immiscible with water and are substantially anhydrous. Mixtures of the various types of lubricants may be employed to obtain compositions having intermediate properties.

The proportion of oleaginous materials to be employed in the present compositions will be discussed hereinafter.

Inorganic aerogel

The gels which may be used in the compositions of the present invention are preferably those known as aerogels of inorganic substances, including silica, magnesia, alumina and other gel-forming metal oxides and hydroxides, sulfides, etc. A typical method for the preparation of such aerogels comprises precipitating silica by the addition of sulfuric acid to sodium silicate solution and washing the gel relatively free of salts with water. This composition is now used in industry as an intermediate in the making of silica gel. If the water is evaporated from the gel in this state, the latter shrinks considerably in volume, apparently due to the force exerted on the solid phase of the gel by the surface tension of the liquid as it recedes in the pores of the material. These materials are referred to as xerogels.

As distinguished from the xerogels, the aerogels are composed of the original solid phase of the gel in substantially the same condition as while filled with the swelling liquid. Aerogels are conveniently made by raising the gel to the critical temperature of the liquid contained therein while maintaining the pressure on the system sufficiently high to insure that the liquid phase will remain liquid until the critical temperature is reached. At this point, the liquid will be converted into the gaseous state without the formation of menisci at a gas-liquid interface. The degree of porosity may be controlled to a large degree by controlling the concentration of silica in the gel as it is precipitated. These aerogels may be used in this condition for the preparation of the present compositions or may be ground to a finer state of subdivision such as in a stone ball mill.

It has been found desirable to use finely ground aerogel in preparing thickened lubricating oils since a smoother, more uniform suspension is obtained. However, a larger amount of ground gel is required to obtain a given degree of thickening in an oil than when unground gel is employed.

Organosilicon halides

Suitable organosilicon halides which may be used for improving the properties of the subject compositions include especially the monomeric and polymeric organo halogen silanes. The monomeric materials, which are preferred, have the general formula:

$$R_n\text{—Si—}X_{4-n}$$

wherein R is an organic radical, X is a halogen atom and $n$ is an integer from one to three. These include especially the trialkylhalosilanes, the dialkyldihalosilanes and the alkyl trihalosilanes, as well as silanes having other types of hydrocarbon radicals, such as cycloalkyl or aryl substituents. Of this group the dialkyldihalosilanes are preferred, and the dialkyldichlorosilanes have been found to be especially effective.

Typical species of these various materials include tripropylbromosilane, dimethyldichlorosilane, triphenylfluorosilane and diallyldichlorosilane. The silane should have a boiling point which is suitably low so as to permit its vaporization prior to or during absorption on the aerogel discussed above. Dimethyldichlorosilane is particularly suitable for this purpose since it has a relatively high vapor pressure at room temperature.

Other ingredients

The thixotropic gels and greases containing the above essential ingredients may be modified by the addition of other substances such as viscosity index improvers, oxidation inhibitors, wetting agents and pigments. Viscosity index improvers, such as the polymeric esters of acrylic acid and methacrylic acid, are especially suitable for modifying the properties of the gels or greases containing mineral oils or dicarboxylic esters. The addition of amines or amino phenols may serve the double purpose of inhibiting oxidation and promoting the water resistance of the composition. Weighting agents, such as are commonly employed in oil-well drilling fluids, may be added to increase the specific gravity for this particular purpose. Soaps may be employed either in minor quantities for the improvement of water resistance or as a modifying ingredient effecting the gel structure. However, the three components described in detail above will constitute a major proportion of the compositions.

Process of preparation

If an undisturbed granulated mass of an inorganic aerogel is exposed to the action of vaporized organosilicon halide, the product obtained has been found to be unsuitable for use in the present compositions. Apparently, this is due to the preferential absorption of the halide on the surfaces of the outer particles of the mass of aerogel with the consequence that a substantial portion of the aerogel remains unchanged. Gels and greases made from such a product are too fluid in character or are non-homogeneous.

In order to effect satisfactory absorption of the organosilicon halide on the surfaces of the aerogel particles, it has been found essential to agitate the particles vigorously while they are exposed to the vapors of an organosilicon halide. By this means, it is possible to produce uniform sorption on each of the particles and, hence, permit the preparation of a product suitable for use in the compositions discussed.

Subsequent to sorption of the organosilicon halide on the aerogel, the modified particles are dispersed in the oleaginous carrier by mixing in a colloid mill or grease-making equipment.

The enormous surface possessed by the finely ground aerogel necessitates using substantial amounts of the organosilicon halide for the production of gels and greases having satisfactory water resistance and flame resistance. A sufficient amount of the organosilicon halide should be absorbed at least to provide approximately a mono-molecular layer thereof on the surface of each of the gel particles; hence, it has been necessary to employ from 0.5 to 5 parts of the organosilicon halide for each part by weight of the inorganic aerogel. In order to produce thixotropic gels suitable for use as oil-well drilling fluids or grease having satisfactory properties, from about 5 to 20 parts of the oleaginous material for each part by weight of the inorganic aerogel must be used. Preferably, from 1 to 2 parts of dialkyldichlorosilane and 8 to 15 parts of an oleaginous substance are used per part of aerogel in these compositions. Use of excessive amounts of the silane results in destruction of the gelling power of the aerogel.

The following examples illustrate the process of the present invention.

Example I

The silica gel employed in the following examples had surface area estimated to be approximately 425 square meters per gram, a pour volume of 1.23 cc. per gram and a bulk density of 0.05.

The dry aerogel was treated with dimethyldichlorosilane by saturating dry air with vapors of the silane and passing the gaseous mixture through the aerogel at such a rate that the latter was continuously and vigorously agitated. The silane and air are contacted with the aerogel at about 25° C. An undetermined degree of polymerization of the silane occurred on the surface of the aerogel. This method was employed in the preparation of each of the silica gels described in the following examples.

*Example II*

Eight parts by weight of the silica gel were treated with 5.6 parts by weight of dimethyldichlorosilane as described above. Two parts by weight of kerosene are added. A thixotropic gel was formed which was stable toward the action of water and which exhibited satisfactory stability properties at elevated temperatures.

*Example III*

Eight parts by weight of silica gel were treated as described above with 4.5 parts by weight of dimethyldichlorosilane. One part by weight of the treated gel and six parts by weight of a high viscosity index mineral lubricating oil were stirred together to form a grease. The composition was found to be uneffected by boiling water and to be stable for periods longer than four months.

I claim as my invention:

1. A composition comprising the following ingredients in the stated relative proportions:

| | Parts by weight |
|---|---|
| Mineral oil | 5–20 |
| Silica aerogel | 1 |
| Dialkyldichlorosilane | 0.5–5 | said silane being sorbed on the gel, the latter being dispersed in the oil.

2. A composition comprising the following ingredients in the stated proportions:

| | Parts by weight |
|---|---|
| Mineral lubricating oil | 5–20 |
| Silica aerogel | 1 |
| Dimethyl dichlorosilane | 0.5–5 | said silane being sorbed on the gel, the latter being dispersed in the oil.

3. A composition comprising the following ingredients in the stated proportions:

| | Parts by weight |
|---|---|
| Kerosene | 5–20 |
| Silica aerogel | 1 |
| Dimethyldichlorosilane | 0.5–5 | said silane being sorbed on the gel, the latter being dispersed in the kerosene.

4. A composition comprising the following ingredients in the stated proportions:

| | Parts by weight |
|---|---|
| Mineral oil | 5–20 |
| Silica aerogel | 1 |
| Dimethyldichlorosilane | 0.5–5 | said silane being in the form of a coating on the gel, the latter being dispersed in the oil.

5. A composition of matter comprising the following ingredients in the stated proportions:

| | Parts by weight |
|---|---|
| Oleaginous substance | 5–20 |
| Inorganic aerogel | 1 |
| Organosilicon halide | 0.5–5 | said halide being sorbed on said aerogel, the latter being dispersed in the oleaginous substance.

6. A composition of matter comprising the following ingredients in the stated proportions:

| | Parts by weight |
|---|---|
| Oleaginous substance | 8–15 |
| Inorganic aerogel | 1 |
| Organosilicon halide | 1–2 | said halide being sorbed on said aerogel, the latter being dispersed in the oleaginous substance.

7. A composition comprising the following ingredients in the stated proportions:

| | Parts by weight |
|---|---|
| Mineral oil | 5–20 |
| Inorganic aerogel | 1 |
| Alkylhalosilane | 0.5–5 | on said aerogel, the latter being dispersed in the oil.

8. A composition comprising the following ingredients in the stated proportions:

| | Parts by weight |
|---|---|
| Oleaginous substance | 5–20 |
| Inorganic grease-forming gel | 1 |
| Organosilicon halide | 0.5–5 | said halide being sorbed on said gel, the latter being dispersed in the oleaginous substance and having a structure substantially the same as originally formed.

9. A composition comprising the following ingredients in the stated proportions:

| | Parts by weight |
|---|---|
| Oleaginous substance | 5–20 |
| Inorganic grease-forming gel | 1 |
| Polymerization product of an organisilicon halide | 0.5–5 | said polymerization product being sorbed on said gel, the latter being dispersed in the oleaginous substance and having a structure substantially the same as originally formed.

10. A composition according to claim 9, said composition having been formed by contacting an organosilicon halide and an inorganic grease-forming gel, the latter being in an agitated condition, so as to uniformly sorb the halide thereon and subsequently dispersing the product so obtained in the oleaginous substance.

11. A composition comprising the following ingredients in the stated proportions:

| | Parts by weight |
|---|---|
| Mineral lubricating oil | 5–20 |
| Inorganic grease-forming gel | 1 |
| Polymerization product of an alkylhalosilane | 0.5–5 | said polymerization product being sorbed on said gel, the latter being dispersed in the mineral oil and having a structure substantially the same as originally formed.

12. A composition comprising the following ingredients in the stated proportions:

| | Parts by weight |
|---|---|
| Mineral oil | 5–20 |
| Inorganic grease-forming gel | 1 |
| Polymerization product of dimethyldichlorosilane | 0.5–5 | said polymerization product being sorbed on said gel, the latter being dispersed in the mineral oil and having a structure substantially the same as originally formed.

13. A composition comprising the following ingredients in the stated proportions:

| | Parts by weight |
|---|---|
| Mineral oil | 5-20 |
| Inorganic grease-forming metallic oxide | 1 |
| Polymerization product of dimethyldichlorosilane | 0.5-5 | said polymerization product being sorbed on said gel, the latter being dispersed in the mineral oil and having a structure substantially the same as originally formed.

14. A composition comprising the following ingredients in the stated proportions:

| | Parts by weight |
|---|---|
| Mineral oil | 5-20 |
| Silica gel | 1 |
| Polymerization product of dimethyldichlorosilane | 0.5-5 | said polymerization product being sorbed on said gel, the latter being dispersed in the mineral oil and having a structure substantially the same as originally formed.

FRED H. STROSS.

REFERENCES CITED

The following references are of record in the file of this patent:

UNITED STATES PATENTS

| Number | Name | Date |
|---|---|---|
| 2,260,625 | Kistler | Oct. 28, 1941 |
| 2,408,654 | Kirk | Oct. 1, 1946 |
| 2,424,853 | Safford | July 29, 1947 |
| 2,428,608 | Bass | Oct. 7, 1947 |
| 2,439,689 | Hyde | Apr. 13, 1948 |
| 2,441,422 | Krieble et al. | May 11, 1948 |